United States Patent [19]

Zetterlund

[11] Patent Number: 5,466,029

[45] Date of Patent: Nov. 14, 1995

[54] SUNVISOR

[76] Inventor: Karl E. Zetterlund, 12625 Memorial Dr. #3, Houston, Tex. 77024

[21] Appl. No.: 333,136

[22] Filed: Nov. 1, 1994

[51] Int. Cl.⁶ ..................................................... B60J 3/02
[52] U.S. Cl. ........................................ 296/97.8; 296/97.6
[58] Field of Search ................................. 296/97.6, 97.8, 296/97.9

[56] References Cited

U.S. PATENT DOCUMENTS

| | | | |
|---|---|---|---|
| 3,369,837 | 2/1968 | Metier | 296/97.6 |
| 3,428,360 | 2/1969 | Honor, Sr. | 296/97.6 |
| 4,690,451 | 9/1987 | Killar | 296/97.6 |
| 5,271,653 | 12/1993 | Shirley | 296/97.6 X |

*Primary Examiner*—Joseph D. Pape

[57] ABSTRACT

A sunvisor intended to be mounted on or incorporated in standard windshield visors in vehicles and airplanes and which visor consists of two main parts such as a stationary panel which incorporates a slidable panel which panel can be partly moved in or out of the stationary panel vertically as well as sideways or angled left or right of the stationary panel. This construction enables the driver of a vehicle or the pilot of an airplane to position the sunglare protective shield (slidable panel) in variety of positions which by far exceeds the possibilities of existing sunglare protective shields. The main idea is that the sliding panel is equipped with a magnet which attracts to the backing steel plate of the stationary part and thus will hold the slidable visor in any position as it is left in. Another feature is that the slidable panel is restricted in its movement by a limiter consisting of a frame which forms one side of the stationary part. On the sliding panel there is a knob which extrudes through the space surrounded by said frame and thus works as a limiter as well as a protection for the slidable panel so it will not inadvertently fall down and thus completely leave the stationary part.

3 Claims, 3 Drawing Sheets

SUNVISOR

BRIEF SUMMARY OF THE INVENTION

The intention of this invention is to overcome the severe difficulties a driver of a vehicle or airplane is encountered with when direct sunglare or glare from other light sources irritates.

This particular invention is unique in such a way that not only the extendable sunglare/light absorbing reflecting panel can be pulled down and or up vertically but also sideways in such a way that the movable panel extends outside of the "mother" panel in at least three directions and also can be positioned at an angle if so desired.

In addition to the basic design which is intended to be attached to existing sunvisors it can also be incorporated in a padded standard visor for new vehicles/airplanes or manufactured as a complete replacement for the standard padded visor in older vehicles/airplanes.

It is to be understood that the attachment type visor as described can be attached to the existing visor by other conventional means such as rubber bands, other flexible fasteners, "VELCRO" type fastener or similar. The attached drawings show clamp type fasteners only.

It is also to be understood that in addition to the material mentioned in the detailed description of the drawings the stationary panel can be made of plastic or other non magnetic attractive material but with a steel plate inserted in the backing plate of said stationary panel or that the positioning of the sliding panel can be achieved by making the folded steel panel compressive and thus holding the sliding panel in position. An other alternative is that when the stationary panel is made of plastic or other non magnetic material the inside of the frame and backing plate of the stationary part can be fitted with compressible soft material which will hold the sliding panel in any position as it is left in.

An important factor is that due to the design with a frame and an operative or limiter knob working within and extended through the framed space the sliding panel can not inadvertently fall down and cause incidents such as limit movement of brake pedals or other devices in the vehicle or air plane where it is used.

Also shown are two clamps which are used to attach the invention to existing sun visors.

Figure 2:
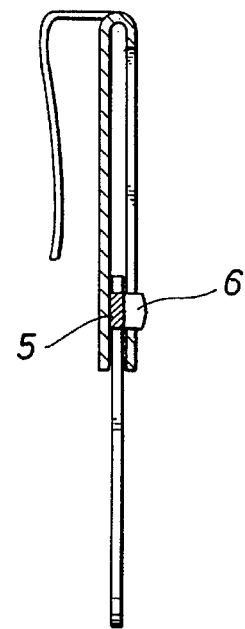

FIG. 2 is a sectional view of a middle part of the invention showing a fixed panel, a sliding panel, attachment clamps, a magnet and an operating knob attached to the movable panel.

Figure 3:
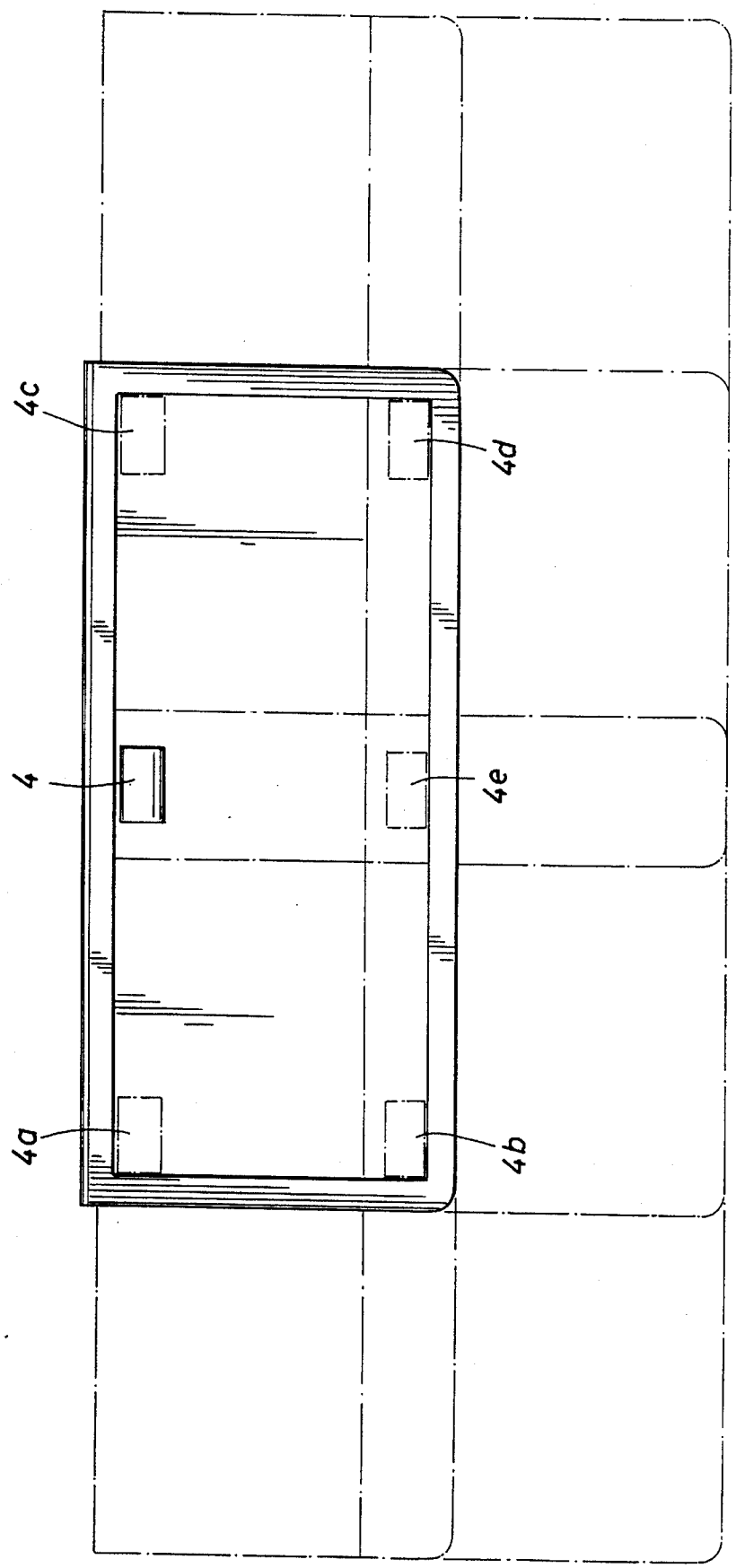

FIG. 3 shows six different locations of the slidable panel when the panel is moved over to its maximum operating range for positions indicated.

Figure 1:
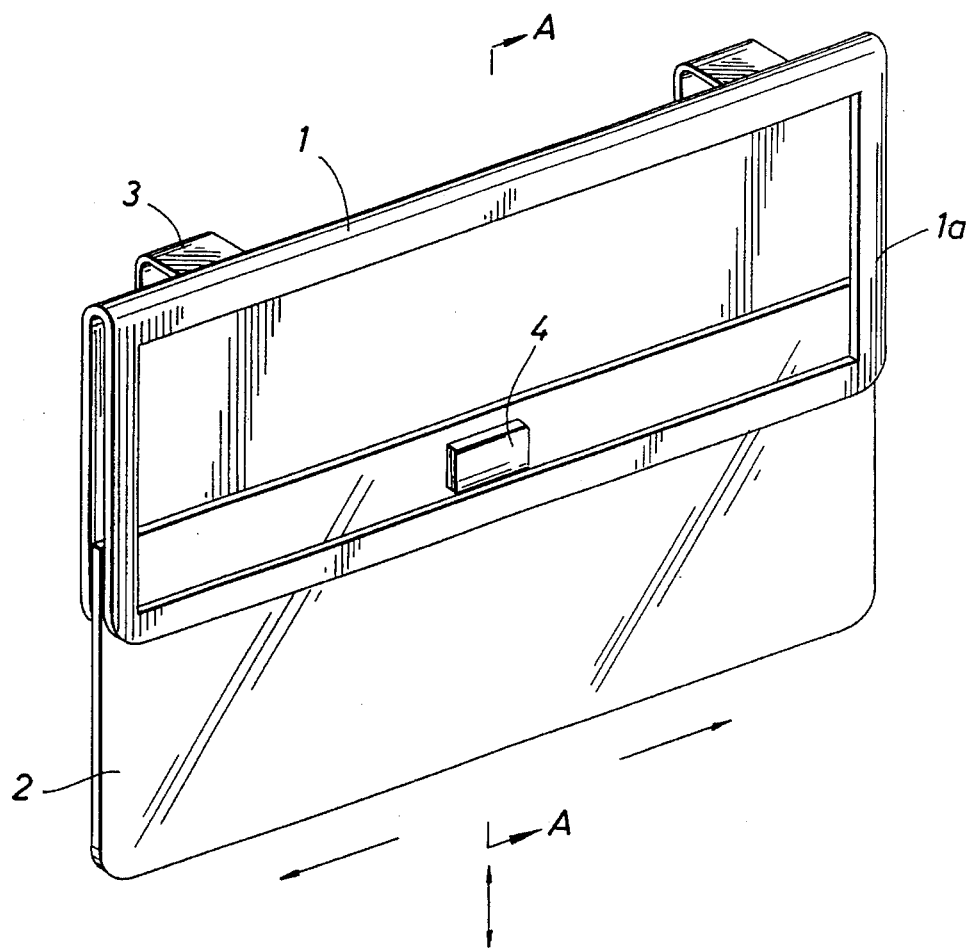
FIG. 1 is a perspective view of the invention showing the slidable panel fully extended vertically. The operating knob resting at the bottom of the fixed panel integrated frame.
Figure 4:
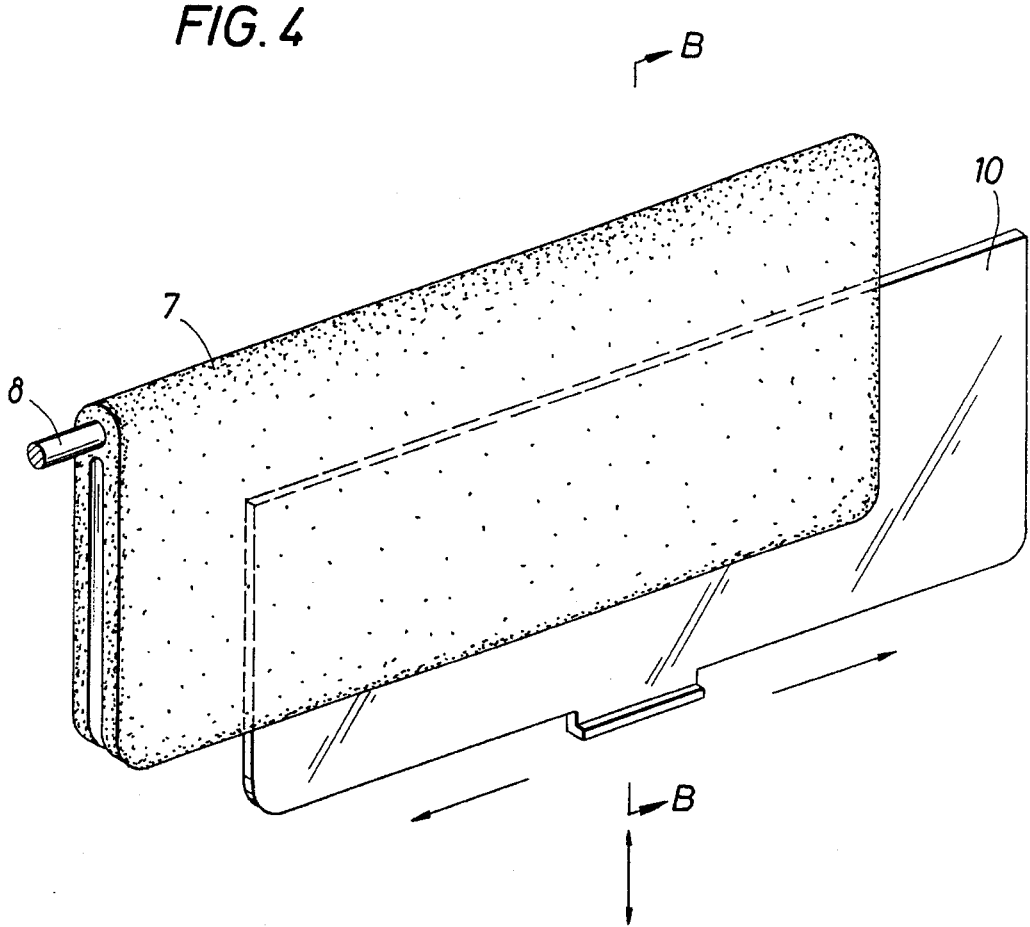

FIG. 4 is a perspective drawing of a padded visor with the basic construction as per FIG. 1 (clamps excepted) incorporated in a padded complete visor to be used as a replacement in older vehicles/airplanes or as a standard outfit in new production vehicles/airplanes and with the sliding visor panel extended partly vertically and partly sideways.

Figure 5:
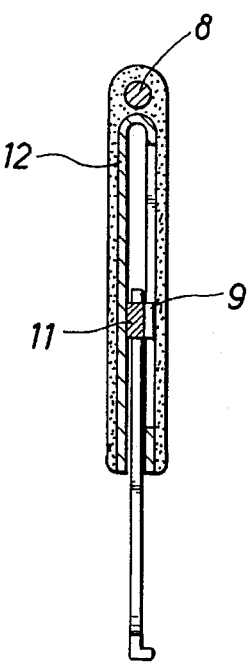

FIG. 5 is a sectional drawing of visor as per FIG. 4, showing basic construction which includes a magnet and an operation limitation knob.

DETAILED DESCRIPTION OF THE INVENTION

FIG. 1 illustrates the basic embodiment of the invention where the stationary body 1 is made from a folded steelplate which on the frontside has a cutout forming a frame 1a.

The sliding panel 2 operates vertically, sideways or at an angle which is possible to achieve the operating limits determined by the frame and operating knob 4 which consists of a magnet and a knob attached to the sliding panel and which knob extends through the frame. Clamps 3 are attached to the stationary body.

The sectional view A—A of FIG. 1 shows the operating knob consisting of a magnet 5 and knob 6.

As shown the knob extends through the frame and thus limits the movement of the sliding panel.

FIG. 3 illustrates how the sliding panel can be moved in or out from the stationary body in both vertically and sideways directions.

Position 4 shows the sliding panel in a fully retracted position inside the stationary body. Position 4a shows the sliding panel fully extended to the left from position 4. Position 4c shows the sliding panel fully extended to the right from position 4. Position 4b shows the sliding panel fully extended to its maximum lower vertical and left position. Position 4e shows the sliding panel fully extended vertically from position 4. Position 4d shows the sliding panel fully extended to its maximum lower vertical and right position.

FIG. 4 illustrates the complete replacement visor consisting of padded body 7 with attachment rod 8 incorporating stationary body 12 as per FIG. 1 with exclusions for clamps 3 (FIG. 1) and with sliding panel 10 equipped with a handling part in central bottom part.

The illustration shows the movable panel 10 in partly vertical and partly right sideways extended position.

FIG. 5 illustrates cross section B—B of FIG. 4 showing the padded part embodying folded stationary panel 12 magnet 11 and operating limitation knob 9 which operates within borders determined by the cutout of one side of stationary panel 12 forming a frame.

I claim:

1. An auxiliary sun visor adapted to be removably mounted on a main sun visor of a motor vehicle or airplane comprising:

a metal panel folded to form an inverted U-shape having a forward and a rearward, generally rectangular leg, said rearward leg having a generally rectangular cut out therethrough, said cut out forming a frame;

a sliding panel of a shape generally conforming to and received between the legs of the metal panel, said sliding panel having a slot with an operating knob therein, said knob having a portion which extends rearwardly through the frame of the metal panel and a portion comprising a magnet which faces forwardly for magnetic attraction to the forward leg of the metal panel, said sliding panel being formed from sunglare absorbing, reflecting, photochromatic, tinted transparent, or opaque material;

whereby the sliding panel is positionable by the operating knob in any position including left, right and vertically so that the operating knob is within the frame formed by the cut out in the metal panel, said panel being held in any position desired by the magnetic attraction of the knob to the forward leg of the metal panel wherein glare is reduced for the operator of the motor vehicle or airplane.

2. The auxiliary sun visor of claim 1 wherein the metal panel includes a pair of clamps attached to the forward face of the forward leg of the metal panel for attachment of the auxiliary sun visor to the main sun visor of the motor vehicle or airplane.

3. An auxiliary sun visor adapted to be mounted inside a padded, main sun visor of a motor vehicle or airplane comprising:

- a metal panel folded to form an inverted U-shape having a forward and a rearward, generally rectangular leg, said rearward leg having a generally rectangular cut out therethrough, said cut out forming a frame;
- a sliding panel of a shape generally conforming to a received between the legs of the metal panel, said sliding panel having a slot with a positioning knob therein, said knob having a portion which extends rearwardly into the frame of the metal panel and a portion comprising a magnet which faces forwardly for magnetic attraction to the forward leg of the metal panel, said sliding panel being formed from sunglare absorbing, reflecting, photochromatic, tinted transparent, or opaque material, said sliding panel further including a handling tab at the bottom edge thereof;

whereby the sliding panel is positionable by the handling tab in an y position including left, right and vertically so that the positioning knob is within the frame formed by the cut out in the metal panel, said panel being held in any position desired by the magnetic attraction of the knob to the forward leg of the metal panel wherein glare is reduced for the operator of the motor vehicle or airplane.

\* \* \* \* \*